United States Patent Office 3,003,054
Patented Oct. 3, 1961

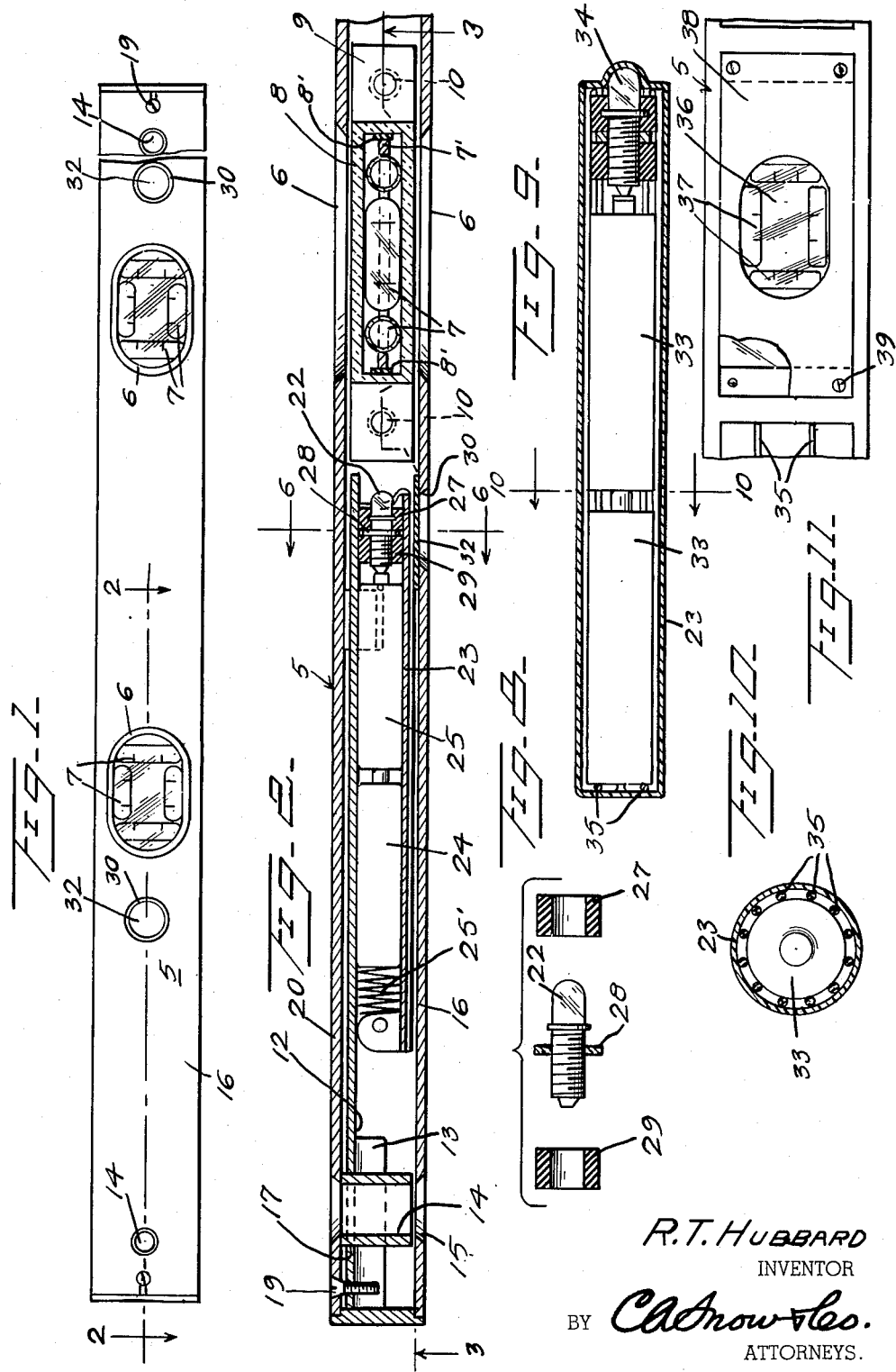

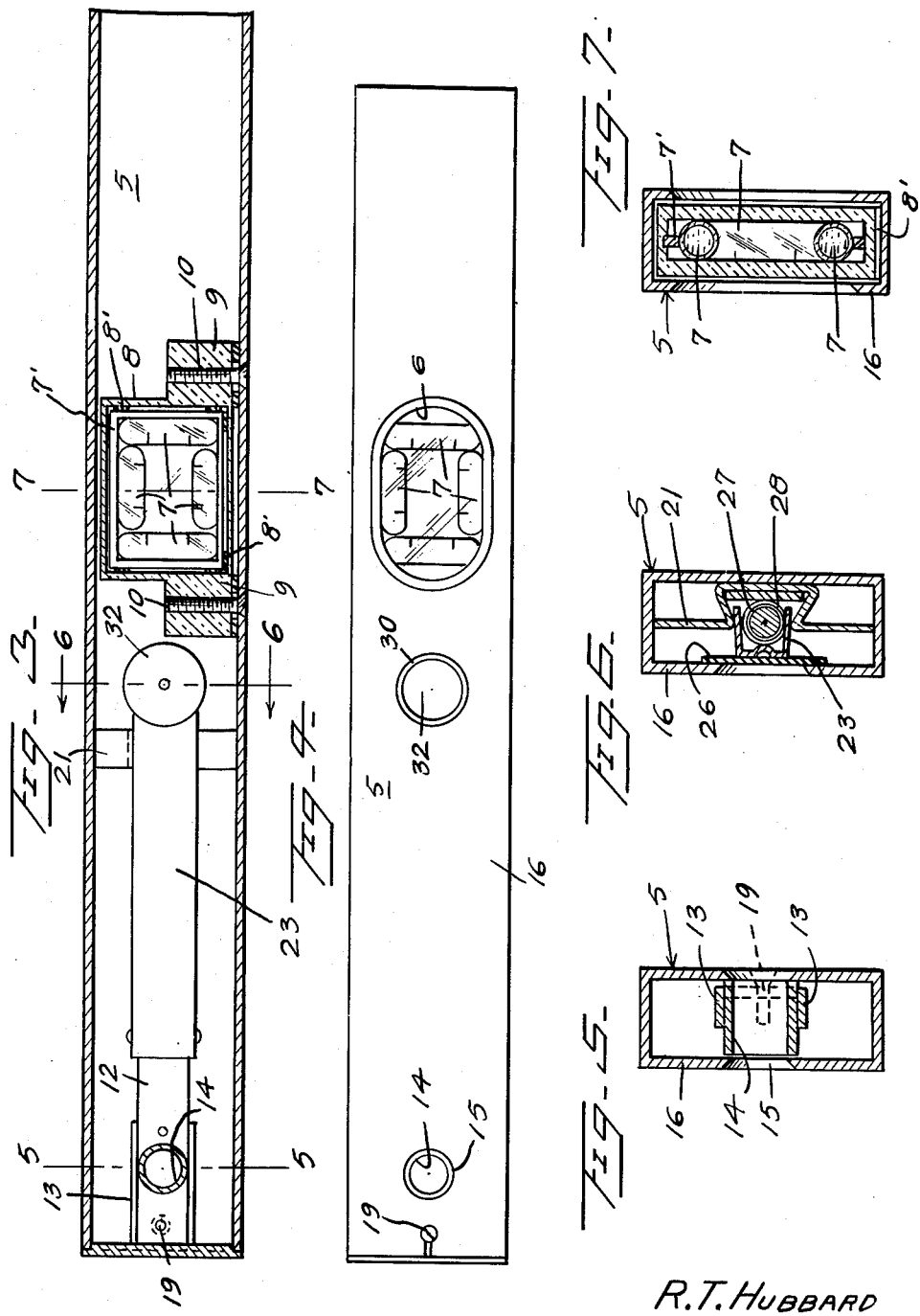

3,003,054
ILLUMINATED SPIRIT LEVEL
Richard T. Hubbard, 13418 E. 15th, Spokane, Wash.
Filed Sept. 9, 1960, Ser. No. 55,005
3 Claims. (Cl. 240—6.44)

This invention relates to spirit levels, the primary object of the invention being to provide a spirit level wherein the spirit vials thereof may be illuminated for reading in dark or out of the way areas.

An important object of the invention is to provide a level of this character wherein the spirit vials are arranged in groups and an electric lamp so arranged that the electric current will be delivered directly to the electric lamp of the device, eliminating the use of electric wiring, which frequently becomes inoperative due to the severe strain caused by usage to which the usual spirit level is subjected.

Another important object of the invention is to provide a spirit level which will be fog, dust and waterproof as well as strong and durable to withstand rough usage to which the instrument may be subjected.

Another object of the invention is to provide a spirit level adjustable through sufficient range to keep the vial readings true in relation to the edges of the level.

Another object of the invention is to provide a spirit level which includes a combined inner spirit tube-containing section and a battery section removable as single elements, thereby to permit replacement of parts and servicing of the level with facility.

Other and further objects and advantages of this invention will be hereinafter described and the novel features thereof defined in the appended claims.

Referring to the drawings:

FIGURE 1 is a side elevational view of a spirit level, constructed in accordance with the invention.

FIGURE 2 is a sectional view taken on line 2—2 of FIGURE 1, on an enlarged scale.

FIGURE 3 is a sectional view taken on line 3—3 of FIGURE 2, on an enlarged scale.

FIGURE 4 is a side elevational view of a modified form of the invention.

FIGURE 5 is a sectional view taken on line 5—5 of FIGURE 3.

FIGURE 6 is a sectional view taken on line 6—6 of FIGURE 3.

FIGURE 7 is a sectional view taken on line 7—7 of FIGURE 3.

FIGURE 8 is an exploded view illustrating the lamp supporting elements of the spirit level.

FIGURE 9 is an enlarged longitudinal sectional view through the battery and switch containing element of a spirit level of modified form.

FIGURE 10 is a sectional view taken on line 10—10 of FIGURE 9.

FIGURE 11 is a fragmental elevational view illustrating a modified form of vial attaching mechanism and removable cover plate.

Referring to the drawings in detail, the spirit level forming the subject matter of the present invention, comprises an elongated body portion 5 constructed preferably of metal, the body portion having aligning openings 6 in the side walls thereof, through which the vials 7 are viewed.

The vials 7 are mounted in a removable vial supporting member 8 as better shown by FIG. 2 of the drawings, the removable vial supporting member 8 being constructed preferably of plastic material and provided with lugs 9 at its base, which lugs are provided with threaded openings to receive the securing screws 10, that pass through one wall of the body portion and operate in the threaded openings to permit the vials to be accurately adjusted with respect to the edges of the level, and at the same time secure the vial mounting in position.

The vial mounting is provided with open sides which are closed by means of transparent closures 11 so that the vials may be viewed through the openings 6.

It might be stated that the vials in this particular form of instrument, are arranged in pairs at right angles with respect to each other, so that the spirit level may be used in various positions. The vials 7 are mounted in a trued metal rectangular ring 7' prior to positioning the supporting member 8 within the body of the spirit level, which rectangular rings 7' are mounted on rubber cushioning members 8'.

Associated with the vials of the spirit level, is a removable light bulb mounting which embodies a supporting member indicated generally by the reference character 12 which is formed with parallel depending flange members 13 disposed adjacent to one end thereof, the supporting member 12 having a tubular member 14 secured therein, adjacent to an opening 15 formed in the side wall 16 of the elongated body 5, as better shown by FIGURE 2 of the drawings.

The tubular member 14 is disposed within an opening 17 formed in the upper stationary plate 18 of the removable light bulb mounting. As shown by FIGURE 2 of the drawings, the ends of the tubular member 14 register with openings in the side walls of the body, so that the device may be conveniently secured over a supporting hook, not shown.

The reference character 19 indicates a securing screw which extends through an opening in the side wall 20 of the body, the screw 19 being threaded in an opening formed in the supporting member 12, securing the supporting member in place, within the body of the spirit level.

As shown, the supporting member 12 extends to a point adjacent to one end of the removable vial mounting, and is provided with laterally extended spacing plates 21 which center the supporting member 12 and holds the same in proper position to project light rays from the bulb 22 mounted thereon, at the inner end of the supporting member.

Forming a part of the supporting member 12, is a channel bar 23 within which the batteries 24 are mounted, there being provided a coiled spring 25' at one end of the channel bar 23, which contacts the adjacent battery 24, normally biasing the batteries 24 and 25 towards the lamp or bulb 22. Disposed at the free end of the channel bar 23, are inwardly extended flanges 26 which flanges provide stops against which the outermost rubber bulb supporting ring 27 engages, holding the ring and electric bulb mounted therein, in its proper position with respect to the vial mounting so that the vials may be illuminated and readily viewed by the direction of the light rays to the vials, when the spirit level is used in dark or out of the way places.

Secured to the stem of the bulb, at a point intermediate the ends thereof, is a metallic washer 28 against which the inner rubber supporting ring 29 engages, as better shown by FIGURE 2 of the drawings.

As shown, the metallic washer is of a diameter slightly less than the diameters of the cooperating rubber supporting ring, so that the circuit from the batteries 24 and 25 will only be completed to the bulb and through the threaded extension of the bulb 30, when the channel bar battery supporting member 23 is moved to compress the rubber rings through which the stem of the bulb extends, to permit the channel bar 23 to contact the metallic disk 28. Thus it will be seen that due to this construction, the circuit to the lamp will only be completed when the channel bar 23 has been moved to contact the metallic washer 28.

An opening 30 is formed in the side wall 16 of the body 5, adjacent to the light supporting end of the channel bar 23.

A disk 32 is secured to the outer surface of the channel bar 23, and is of a diameter appreciably greater than the diameter of the opening 30, so that the disk 32 normally closes the opening 30, but at the same time provides means which when depressed will move the channel bar 23 inwardly until the wall thereof contacts the metallic washer 28, to complete the circuit to the lamp, as previously described.

It will thus be seen that when the bulb 22 is lit, the light rays projected therefrom will be directed to the vials 7 which are contained in the vial bulb mounting 8.

As clearly shown by FIGURE 9 of the drawings, the batteries 33 are positioned in wire cages shown more clearly in FIGURE 10 of the drawings, the wire cages being coated with plastic material to the end that the batteries are supported in a disposable case which is waterproof, a flashlight being supported at the end of the wire cage receiving electric energy from the batteries, the light rays from the flash light 34 or bulb, to illuminate the vials supported at the end of the body of the spirit level in which the batteries are mounted.

The wire cage is indicated by the reference character 35, and as shown extends throughout the length of the channel bar 23 within which the batteries are mounted.

As shown by FIGURE 11 of the drawings, the body 5' is formed with a rectangular cut out portion in which the vial mounting 36, which supports the vials 37, is mounted. The opening in which the vial mounting is positioned is enclosed by the plate 38, which is held in position by means of screws 39 that operate in threaded openings formed in the body 5'.

From the foregoing it will be seen that due to the construction shown and described, I have provided a spirit level wherein the vials of the level will be illuminated, by merely pressing the disk 32 inwardly to compress the rubber supporting rings until the channel bar 23 contacts the metallic contact washer 28, whereupon the circuit will be completed through the light bulb stem, to the batteries, the channel bar 23 acting as the movable section of a switch and causing the lighting of the bulb 22, illuminating the vials.

Having thus described the invention, what is claimed is:

1. In an illuminated spirit level, a hollow body, vial units mounted within said body, said body having sight openings in the wall thereof through which said vial units are viewed, a battery unit slidably mounted within said body, said battery unit embodying a stationary supporting plate and a channel bar pivotally connected at one of its ends to said supporting plate, an electric light bulb mounted within the opposite end of said channel bar, a normally open circuit including batteries mounted within said channel bar, said batteries being in circuit with said light bulb, a pair of spaced rubber supporting rings mounted on the stem of said light bulb, securing said light bulb in position by frictional contact with said channel bar, said channel bar normally resting on said rubber supporting rings out of contact with said metallic washer, and said channel bar adapted to contact said metallic washer, completing the circuit to said light bulb upon pressure directed to said channel bar compressing said rubber rings, exposing said metallic washer for contact by said channel bar.

2. In an illuminated spirit level, an elongated hollow body having sight openings, vial units mounted within said body opposite said sight openings, a self contained battery and an electric light unit mounted within said body, said unit comprising a stationary plate and a channel bar pivotally connected at one of its ends to said stationary plate, an electric light bulb secured in one end of said channel bar, electric batteries secured within said channel bar in circuit with said electric light bulb, a metallic contact washer and rubber supporting rings, mounted on the stem of said electric light bulb, said metallic washer being in contact with said stem of said light bulb, said rubber supporting rings normally extending beyond the periphery of said contact washer, and said channel bar normally resting on said rubber rings, providing a normally open circuit, and said channel bar adapted to be compressed into engagement with said contact washer upon compressing said rubber supporting rings, completing the circuit to said light bulb, illuminating said vials of the spirit level.

3. The structure of claim 2 wherein the vial units comprise a plurality of vials arranged within the mounting, said vials being arranged in pairs disposed at right angles with respect to each other.

References Cited in the file of this patent

UNITED STATES PATENTS

| 2,529,234 | Swanson | Nov. 7, 1950 |
| 2,543,572 | Friberg | Feb. 27, 1951 |

FOREIGN PATENTS

| 1,131,899 | France | Oct. 29, 1956 |